(12) United States Patent
Buchanan (10) Patent No.: US 11,498,178 B2
(45) Date of Patent: Nov. 15, 2022

(54) UNIVERSAL TRAM

(71) Applicant: Doug Buchanan, Liberty, IN (US)

(72) Inventor: Doug Buchanan, Liberty, IN (US)

(*) Notice: Subject to any disclaimer, the term of this patent is extended or adjusted under 35 U.S.C. 154(b) by 71 days.

(21) Appl. No.: 17/236,151

(22) Filed: Apr. 21, 2021

(65) Prior Publication Data

US 2021/0331282 A1 Oct. 28, 2021

Related U.S. Application Data

(60) Provisional application No. 63/013,795, filed on Apr. 22, 2020.

(51) Int. Cl.
*B23Q 17/22* (2006.01)
*G01B 5/00* (2006.01)
*G01B 5/245* (2006.01)

(52) U.S. Cl.
CPC ......... *B23Q 17/225* (2013.01); *G01B 5/0004* (2013.01); *G01B 5/245* (2013.01)

(58) Field of Classification Search
CPC ............................ B23Q 17/225; G01B 5/0004
USPC ..................................................... 33/626–643
See application file for complete search history.

(56) References Cited

U.S. PATENT DOCUMENTS

| | | | |
|---|---|---|---|
| 1,953,614 A | 4/1934 | King | |
| 3,826,011 A * | 7/1974 | D'Aniello | B23Q 17/2258 33/642 |
| 4,251,922 A | 2/1981 | Perlotto | |
| 4,437,803 A | 3/1984 | Volna | |
| 4,752,162 A * | 6/1988 | Groh | B23B 47/288 33/642 |
| 5,365,667 A * | 11/1994 | Golding | G01B 11/26 33/534 |
| 6,032,381 A | 3/2000 | Miller | |
| 6,832,440 B2 * | 12/2004 | Navarro, Sr. | B23Q 17/225 33/642 |
| 6,944,965 B1 | 9/2005 | Watamura | |
| 7,069,666 B2 | 7/2006 | Navarro et al. | |

(Continued)

FOREIGN PATENT DOCUMENTS

| | | |
|---|---|---|
| GB | 1583893 A | 2/1981 |
| WO | 9821548 A1 | 5/1998 |

OTHER PUBLICATIONS

European Patent Office, Patent Translate of WO9221548, 12 pages.

*Primary Examiner* — George B Bennett
(74) *Attorney, Agent, or Firm* — Wood Herron & Evans LLP (57) ABSTRACT

A universal tram is provided for aligning machine tools. The universal tram includes a slide rail, featuring a rail along its length, to which a clamping coupler attaches. In turn, the clamping coupler attaches to the indicator holder. The indicator holder is configured to hold an indicator. The slide rail is configured for direct attachment to horizontal and vertical milling machines, for example. Optionally, the universal tram also includes a machine adapter and adapter plate. The machine adapter serves as a base block for positioning a measurement or tramming device on a machine tool to which the slide rail does not directly attach—a horizontal or vertical lathe, for example. The adapter plate allows for the height of the machine adapter to be adjusted by an amount corresponding to the thickness of the adapter plate. Further, a method of using the universal tram is also provided.

20 Claims, 6 Drawing Sheets

(56) References Cited

U.S. PATENT DOCUMENTS

| | | | |
|---|---|---|---|
| 7,245,199 B1* | 7/2007 | Reilly | B27B 27/00 33/DIG. 1 |
| 7,255,144 B2* | 8/2007 | Smith | B27C 5/04 83/435.11 |
| 7,997,312 B2* | 8/2011 | Van Valkenburg | B27C 5/04 144/286.5 |
| 8,209,873 B1 | 7/2012 | Kipnes | |
| 8,584,372 B2* | 11/2013 | Stoffel | G01B 5/25 33/832 |
| 9,403,252 B2 | 8/2016 | Gordon | |
| 9,592,602 B2* | 3/2017 | Dembeck | B25H 1/0021 |
| 10,150,192 B1 | 12/2018 | Navarro, Sr. | |
| 10,150,194 B1* | 12/2018 | Navarro, Sr. | B23Q 17/2275 |
| 11,040,425 B2* | 6/2021 | Lause | B23Q 17/2233 |

* cited by examiner

UNIVERSAL TRAM

CROSS-REFERENCE TO RELATED APPLICATION

This application is related to and claims priority to U.S. Provisional Patent Application Ser. No. 63/013,795 filed on Apr. 22, 2020, the entire content of which is herein incorporated by reference.

TECHNICAL FIELD

The present invention relates generally to a structure for supporting and positioning measurement devices and, in particular, to a universal tram apparatus that can be used to align a variety of machine tools.

BACKGROUND

Machine tools are machines used to shape rigid materials, such as wood or metal. Common examples of machine tools include turning machines (e.g., lathes), drilling machines (e.g., drill presses), and milling machines. In general, machine tools have three main features. First, machine tools feature a tool for carrying out shaping. Shaping can be accomplished through cuts, shears, squeezes, or other deformations made to a material in a controlled fashion. Second, machine tools feature a means to constrain a material to be tooled. For example, vices are commonly used to secure materials to the table of a drill press. Third and finally, machine tools feature a guided means for bringing together the shaping tool and the constrained material. In the case of a lathe, a carriage is used to move, support, and control the cutting tool while engaging with a material.

For machine tools to efficiently and effectively shape materials, the various parts of the machine tool must be properly aligned. Misalignment of the parts of a machine tool can lead to a bevy of undesirable issues such as increased machine vibration, imprecise or inaccurate shaping, or even damage to the machine leading to a shorter lifespan for the machine. For example, misalignment of a drill press could lead to a larger hole being drilled in a material than the drill bit's diameter due to run-out. On the other hand, a proper alignment of a machine tool can lengthen the operating life of the machine, increase the reliability of the machine, and lead to a more efficient output. Thus, alignment is an important part of machine tool maintenance.

Unfortunately, machine tool alignment performed with traditional procedures using traditional apparatuses is time consuming and difficult. Commonly, alignment of machine tools is accomplished through trial and error which requires a substantial amount of time to perform correctly and utilizes considerable resources. Further, a device used to align a machine tool may be machine-specific and thus not capable of being used to align a different machine. Moreover, a device may be both machine-specific and use-specific. For example, the device used to tram a mill may be different than the device used to check the run-out on a mill which may be different than the device used to center a drill press.

As can be readily discerned from the above description, aligning and adjusting various machine tools using machine-specific tram devices exhibits shortcomings. Accordingly, there is a need for an improved tram device that can be used to help align a variety of machine tools.

SUMMARY

In accordance with an exemplary embodiment of the invention, a universal tram and method of use thereof is described. The universal tram of the present invention addresses the problems and reduces the drawbacks of current apparatuses and methods for tramming machine tools, as developed in the background section above.

In one embodiment, a universal tram apparatus for positioning an indicator for aligning a machine tool is disclosed. The universal tram includes an indicator holder for releasably securing the indicator in place. The indicator may be a dial test indicator or a travel dial indicator, for example. The indicator holder includes a main body having a first rail along a length of a surface of the main body. Arms extend laterally from a side of the main body, adjacent to the surface, and form a first groove at a distal end of the arms. The first groove is configured to releasably secure the indicator in place relative to the indicator holder when a first tightening screw is tightened. The universal tram also includes a clamping coupler. The clamping coupler features a second groove for receiving the first rail of the indicator holder. The second groove corresponds in cross-sectional shape to the first rail and is configured to releasably secure the indicator holder in place relative to the clamping coupler when a second tightening screw is tightened. Further, the clamping coupler includes a third groove on a side of the clamping coupler, opposite the side on which the second groove is located. The universal tram additionally features a slide rail, the slide rail including a second rail along its length. The second rail corresponds in cross-sectional shape to the third groove of the clamping coupler and is configured to be received by the third groove. The second rail is releasably secured relative to the clamping coupler when a third tightening screw of the clamping coupler is tightened. Additionally, the slide rail is removably attached to a machine tool by a central pin that is received by both the slide rail and the machine tool.

In a further embodiment, the clamping coupler further includes a drive plate removably fastened to the clamping coupler, adjacent to the second groove. The drive plate includes an aperture through which a drive pin is inserted. One end of the drive pin is covered by a drive pin knob and the other end of the drive pin extends into the main body of the indicator holder. The end of the drive pin that extends in the indicator holder is threaded. Due to the threading, when the drive pin is rotated in a circumferential direction the indicator holder moves in a longitudinal direction along the second groove—either towards or away from the drive plate.

In yet a further embodiment, the universal tram includes an L-shaped indicator adapter. The indicator adapter features, at one end, a third rail corresponding in cross-sectional shape to the first groove of the indicator holder and is configured to be received by and secured to the indicator holder. At the opposite end, the indicator adapter features an aperture through which an indicator can be inserted. An inserted indicator can then be releasably secured in place by engaging a set screw.

In still a further embodiment, the universal tram includes a machine adapter for expanding the compatibility of the universal tram to include additional machine tools. The machine adapter includes a support base configured to be secured to the machine tool and a connection member, extending from the support base, that includes a plurality of aperture sets spaced from each other at regular intervals. Optionally, the machine adapter includes an adapter plate that can be placed beneath the bottom surface of the support base to adjust the height of the support base relative to the machine tool. The slide rail also includes a plurality of aperture sets, substantially similar to the aperture sets of the machine adapter, such that a position of the slide rail relative to the machine tool can be adjusted by linking one of the aperture sets of the slide rail to a corresponding aperture set of the machine adapter using a central pin and supporting pins. In an embodiment of the universal tram without the machine adapter, the same apertures (specifically, the central aperture) on the slide rail can be used to connect the slide rail directly to the machine tool.

In another embodiment, a universal tram apparatus for positioning an indicator for aligning a machine tool is disclosed. In the embodiment, the universal tram includes an indicator holder, the indicator holder configured to slidably receive an indicator and releasably secure the indicator in place. The universal tram apparatus further includes a clamping coupler. The clamping coupler is configured to slidably receive the indicator holder and releasably secure the indicator holder in place. Additionally, the universal tram includes a slide rail that is configured to be slidably received by the clamping coupler and releasably secured to the clamping coupler. Also, the universal tram includes a machine adapter for expanding the compatibility of the universal tram to include additional machine tools. The slide rail is releasably secured to the machine adapter.

In still another embodiment, a method of using a universal tram to position an indicator for aligning a machine tool is disclosed. The method includes receiving the indicator in a first groove of the indicator holder. The indicator holder includes a main body having a first rail along a length of a surface of the main body. Additionally, the indicator holder includes arms that extend laterally from a side of the main body adjacent to the surface. The arms form the first groove at a distal end of the arms. The method also includes releasably securing the indicator in a position relative to the indicator holder by tightening a first tightening screw on the indicator holder. Further, the method includes receiving the first rail of the indicator holder in a second groove of the clamping coupler. The second groove corresponds in cross-sectional shape to the first rail and the clamping coupler further includes a third groove on a side of the clamping coupler opposite that of the second groove. Also, the method includes releasably securing the indicator holder relative to the clamping coupler by tightening a second tightening screw on the clamping coupler and receiving an elongate second rail of a slide rail in a third groove of the clamping coupler. The second rail corresponds in cross-sectional shape to the third groove. Moreover, the method includes releasably securing the second rail relative to the clamping coupler by tightening a third tightening screw on the clamping coupler and removably attaching the slide rail to the machine tool by a central pin that is received by both the slide rail and the machine tool.

The steps and elements described herein can be reconfigured and combined in different combinations to achieve the desired technical effects in different styles of universal tram, as may be needed in the art. These and other objects and advantages of the present invention shall be made apparent from the accompanying drawings and the description thereof.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

The exemplary embodiments described herein are provided for illustrative purposes and are not limiting. Other embodiments are possible, and modifications may be made to the exemplary embodiments within the scope of the present disclosure. Therefore, the Detailed Description is not meant to limit the scope of the present disclosure.

With reference to FIGS. 1 through 6, embodiments of a universal tram 10 are shown in detail. Advantageously, the universal tram 10 avoids at least some of the problems associated with machine tool 12 alignment performed with traditional procedures using traditional apparatuses. Whereas a typical apparatus for aligning and adjusting a machine tool 12 may be machine-specific, the disclosed universal tram 10 can be used to align and adjust several different machine tools 12. A further advantage of the universal tram 10 is its modularity. Parts can be added to or removed from the universal tram 10 depending on an individual user's needs. For example, a user may add an additional attachment or an adapter to better suit his or her particular use for the universal tram 10. Other advantages and technical effects of the embodiments of this invention will become evident to one skilled in the art from the following description.

Beginning with reference to FIGS. 1-4, an embodiment of the universal tram 10 is shown. The universal tram 10 includes an indicator holder 16 that is configured to releasably secure an indicator 14 (shown in FIGS. 5 and 6) in a chosen position so that the indicator 14 can be used to help align a machine tool 12. The indicator holder 16 features a main body 18 with a first rail 20 extending along a surface 22 of the main body 18. The first rail 20 may have a dovetail cross-sectional shape. Extending laterally from a side of the main body 18, adjacent to the surface 22 along which the first rail 20 extends, the indicator holder 16 includes a pair of arms 24. It is to be understood that the first rail 20 and arms 24 could be alternatively arranged on the main body 18. The distal end 26 of the arms 24 includes a first groove 28 that is configured to releasably secure an indicator 14 to the indicator holder 16. The first groove 28 may have a dovetail cross-sectional shape. A first tightening screw 30 is threaded through a tightening screw aperture 32 proximate to the distal end 26 of the arms 24. The tightening screw aperture 32 is arranged perpendicularly to the first groove 28. When the first tightening screw 30 is tightened, the two arms 24 of the main body 18 are pulled towards each other (e.g., the threaded portion of the first tightening screw 30 engages with one of the arms 24 and draws it towards the other of the arms 24 which abuts against a head of the first tightening screw 30) thereby narrowing the first groove 28 and securing, for example, an indicator 14 in place in the first groove 28. Although the term tightening screw is used for this and other similar elements in the universal tram 10, it will be understood that a threaded bolt or other similar fastener can be used for these adjustments, as these alternatives are meant to be within the scope of the term tightening screw. The indicator 14 may be a dial test indicator. In an alternative embodiment, the indicator holder 16 may engage with an indicator adapter 34 (shown in FIGS. 4 and 6, for example, and described in greater detail below) instead of directly with an indicator 14. To reposition or remove, for example, an indicator 14 or indicator adapter 34, one would loosen the first tightening screw 30 thereby expanding the width of the first groove 28.

In turn, the indicator holder 16 is releasably secured to the clamping coupler 36. On a side, the clamping coupler 36 includes a second groove 38 that corresponds in cross-sectional shape to the first rail 20 of the indicator holder 16. For example, the second groove 38 may have a dovetail cross-sectional shape. The first rail 20 of the indicator holder 16 can be slid into the corresponding second groove 38 of the clamping coupler 36 to couple the indicator holder 16 to the clamping coupler 36. To secure the indicator 14 in place relative to the clamping coupler 36, a user can engage a second tightening screw 40 on the clamping coupler 36. Similar to the indicator holder 16, the clamping coupler 36 features a second tightening screw 40 that is threaded through a tightening screw aperture 32 proximate to the second groove 38 for the first rail 20. The tightening screw aperture 32 is arranged perpendicularly to the second groove 38. When the second tightening screw 40 is tightened, the two sides of the second groove 38 are pulled towards each other thereby narrowing the second groove 38 and securing the indicator holder 16 in place. To reposition or remove the indicator holder 16, one would loosen the second tightening screw 40 proximate to the second groove 38 for the indicator holder 16 thereby expanding the width of the second groove 38.

Figure 1:
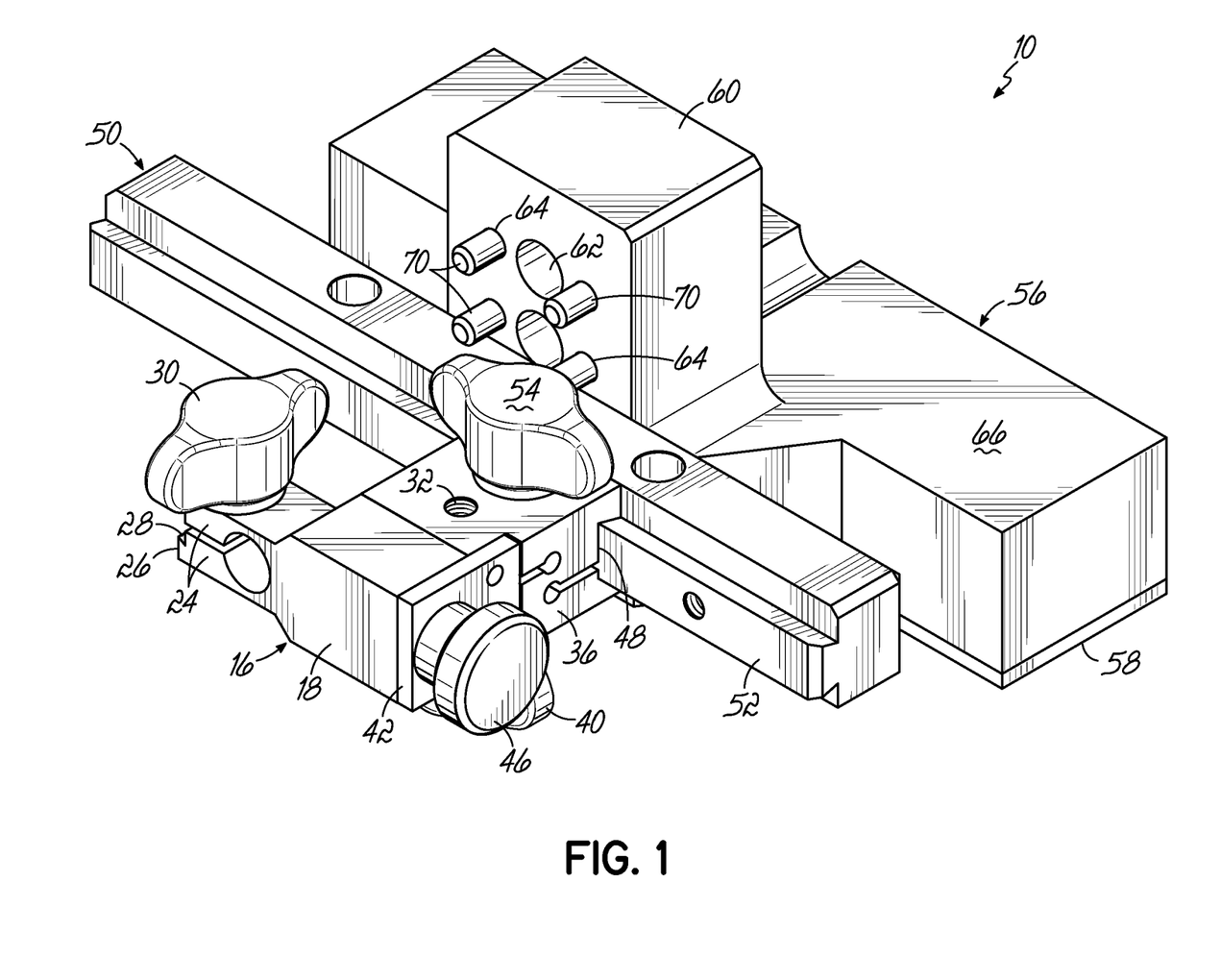
FIG. 1 is a perspective view of an embodiment of a universal tram.
Figure 2:
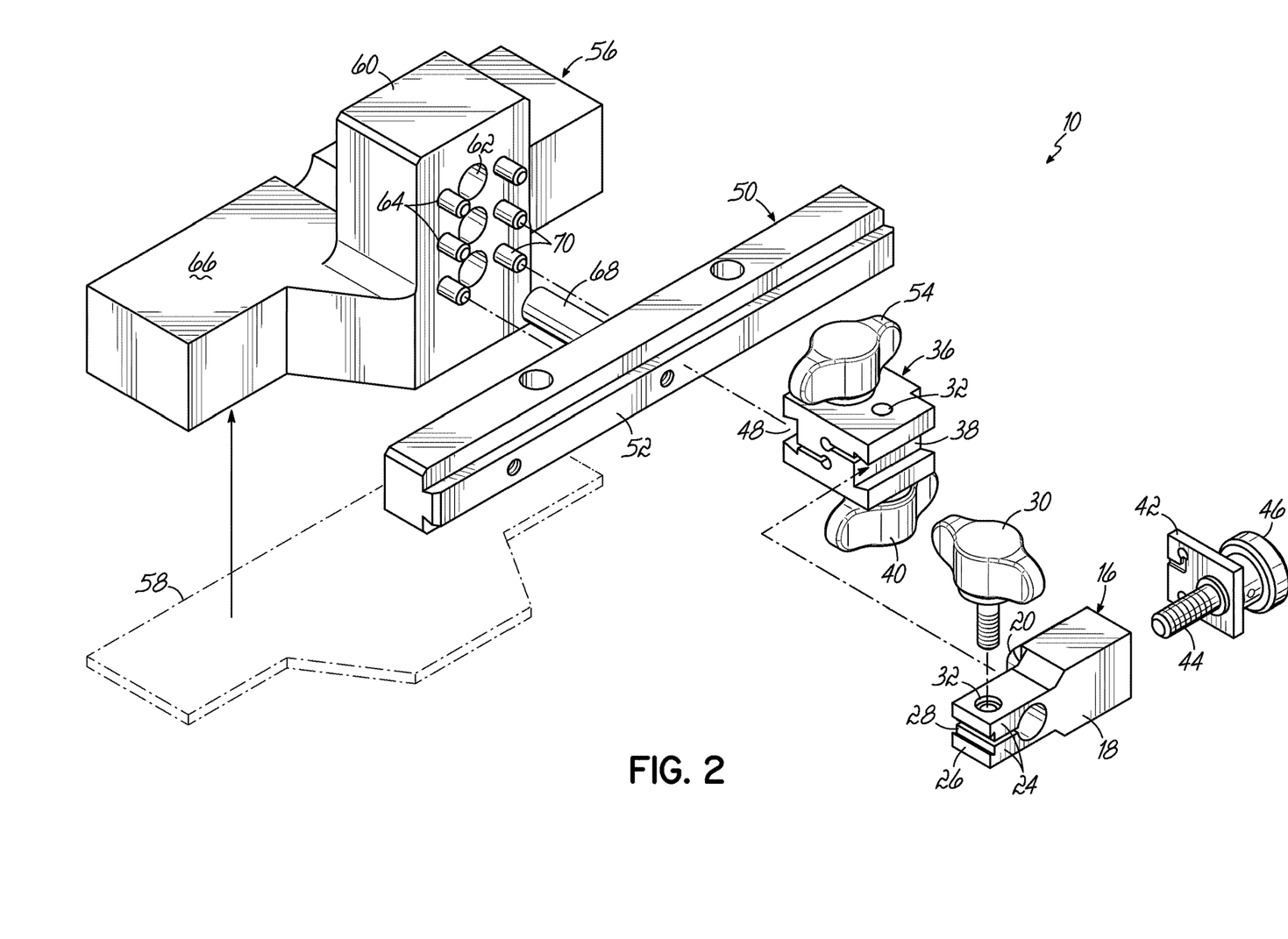
FIG. 2 is a top front exploded perspective view of the embodiment of the universal tram of FIG. 1.
Figure 3:
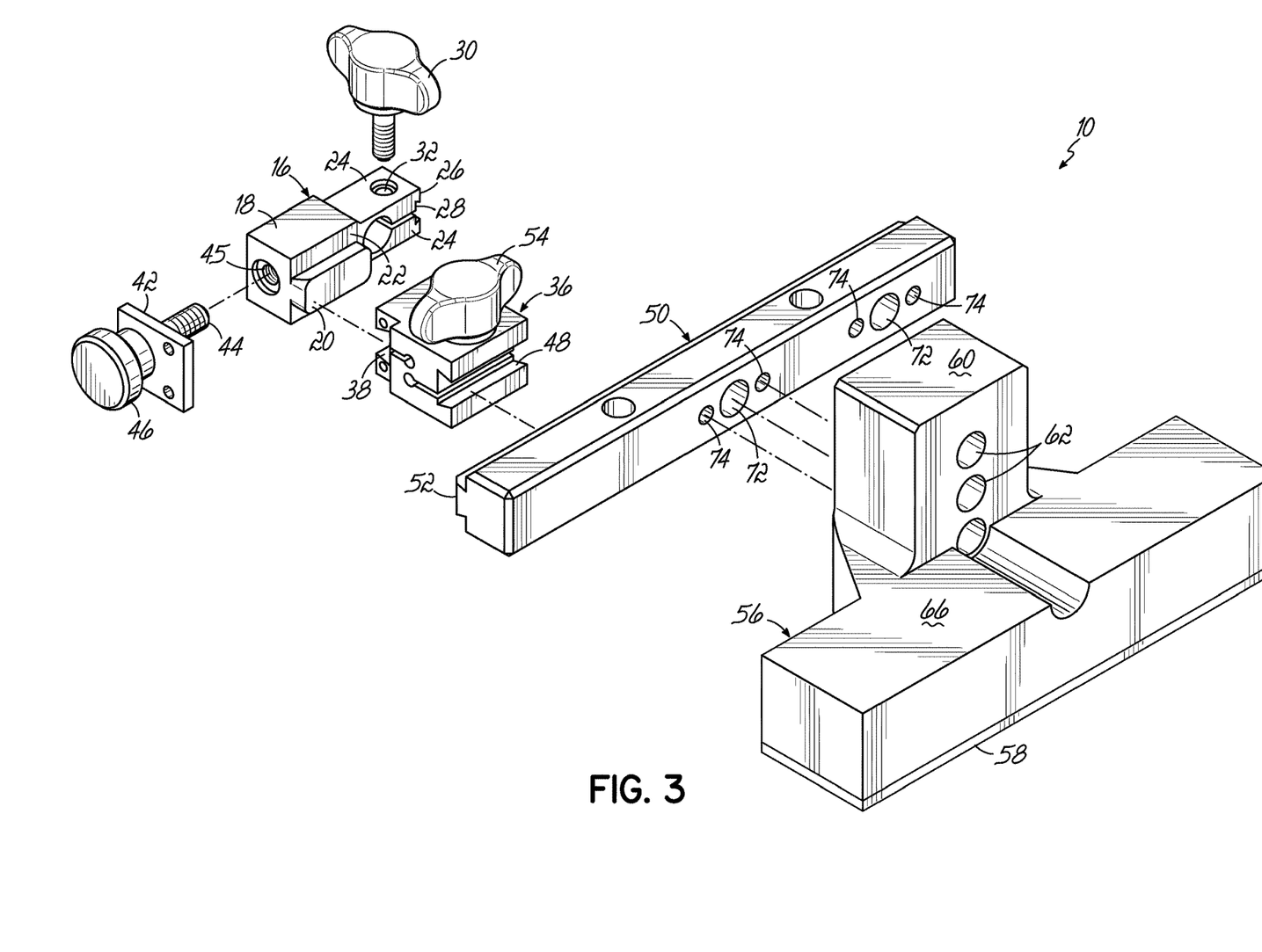
FIG. 3 is a top rear exploded perspective view of the embodiment of the universal tram of FIG. 1.
Figure 4:
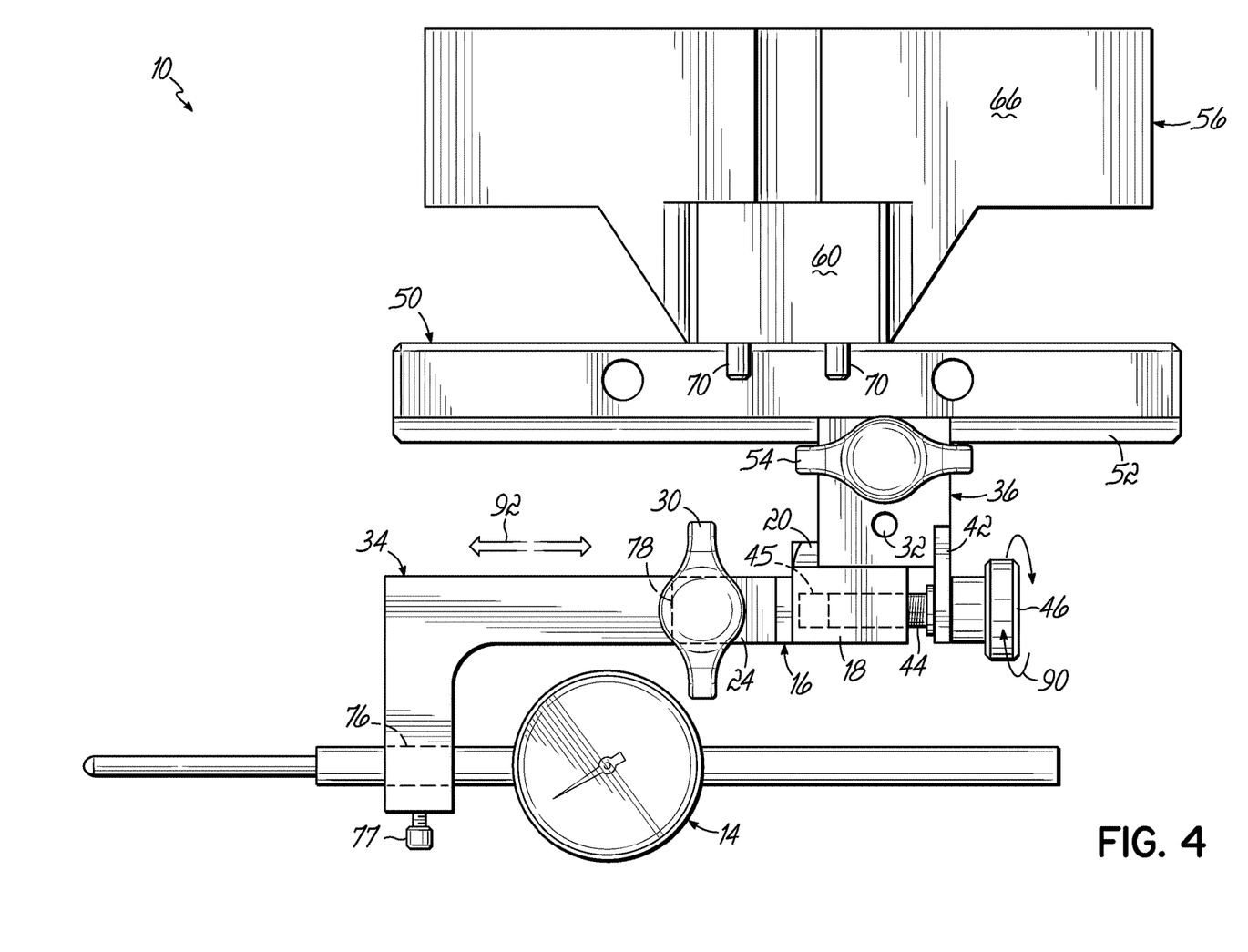
FIG. 4 is a top view of the embodiment of the universal tram of FIG. 1.
Figure 6:
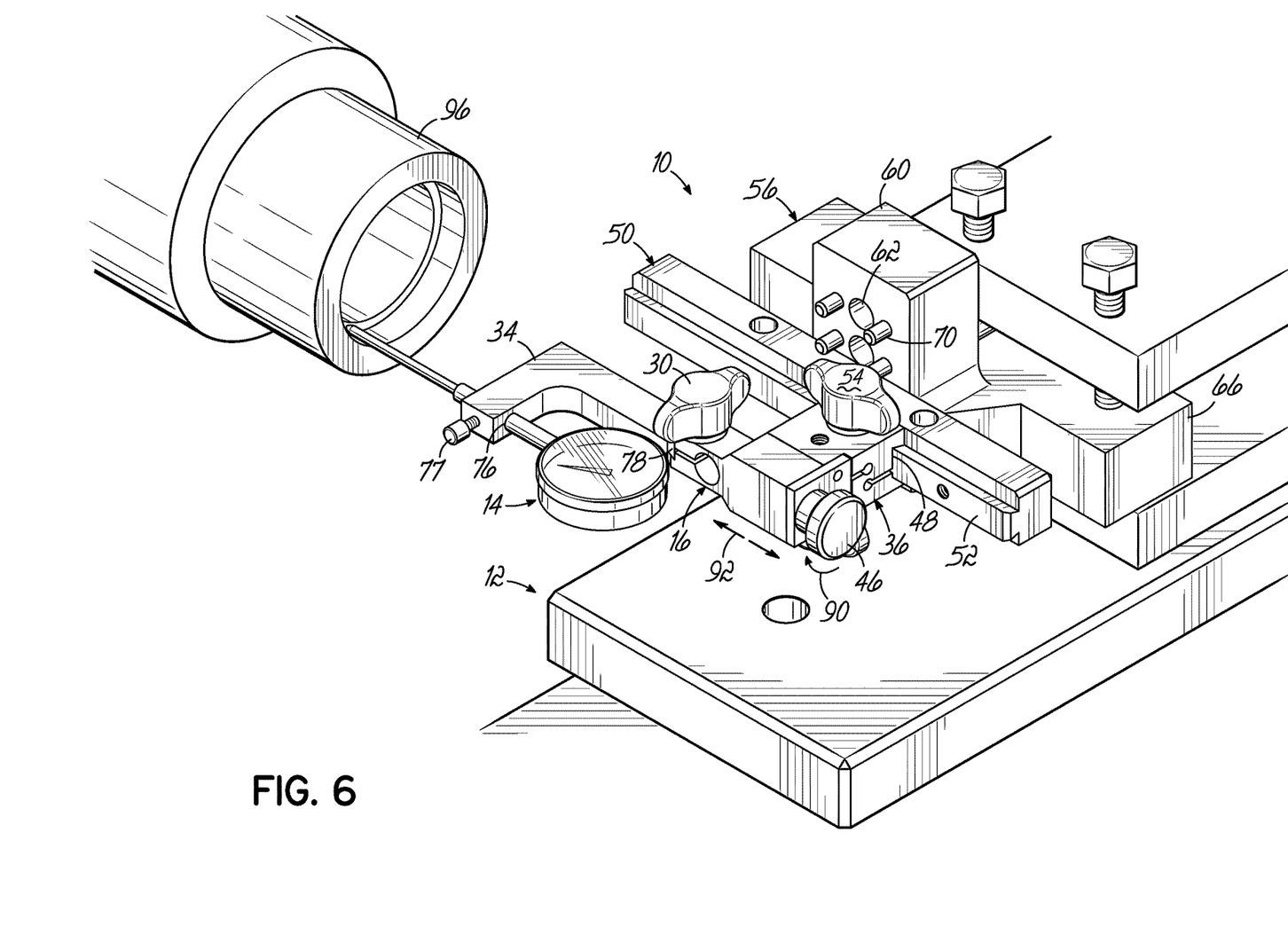
FIG. 6 is an environmental view of a further alternative embodiment of a universal tram.

Still referring to FIGS. 1-4, the position of the indicator holder 16 relative to the clamping coupler 36 can be further adjusted using a drive plate 42 and drive pin 44. A drive plate 42 is removably fastened to the clamping coupler 36, adjacent to the clamping coupler's 36 second groove 38 for the indicator holder 16, by mechanical fasteners, such as screws. It is to be understood that other fasteners or techniques for fastening may be substituted. The face of the drive plate 42 features an aperture through which a drive pin 44 is inserted. One end of the drive pin 44 is threaded and engages with a threaded aperture 45 (shown, for example, in FIG. 3) in the indicator holder 16 while the other end of the drive pin 44 engages with a drive pin knob 46. The drive pin knob 46 is secured to the drive pin 44 such that rotating the drive pin knob 46 will cause the drive pin 44 to rotate. The drive pin knob 46 may feature a knurled surface to provide for a user to better grip the drive pin knob 46. Rotating the drive pin knob 46 (and thus the attached drive pin 44) in a circumferential direction (as shown in FIGS. 4 and 6, for example, by directional arrows 90) causes the indicator holder 16 to move in a longitudinal direction along the clamping coupler's 36 second groove 38—either towards or away from the drive plate 42, depending on the direction the drive pin knob 46 is turned (as shown in FIGS. 4 and 6, for example, by directional arrows 92). In this way, the drive pin 44 functions as a fine adjustment to the location of the indicator holder 16 relative to the clamping coupler 36, while a user's positioning or repositioning using the second tightening screw 40 functions as a coarse adjustment to the location of the indicator holder 16.

The clamping coupler 36 further includes an additional third groove 48 (distinct from the second groove 38 for the first rail 20) for receiving and releasably securing a slide rail 50 to the clamping coupler 36. The third groove 48 corresponds in cross-sectional shape to a second rail 52 of the slide rail 50. For example, the third groove 48 may have a dovetail cross-sectional shape. The third groove 48 is located on a side of the clamping coupler 36 opposite that of the second groove 38 for the indicator holder 16. It is to be understood that the second groove 38 for the indicator holder 16 and the third groove 48 for the slide rail 50 could be alternatively arranged on the clamping coupler 36. The second rail 52 of the slide rail 50 can be slid into the corresponding third groove 48 of the clamping coupler 36 at either end of the slide rail 50 to couple the slide rail 50 to the clamping coupler 36. Once the clamping coupler 36 is slid onto the slide rail 50, the clamping coupler 36 can slide freely along the slide rail 50 until a user engages a third tightening screw 54. To adjust the position of the clamping coupler 36 on the slide rail 50, a user merely loosens the third tightening screw 54, slides the clamping coupler 36 to a new location, and re-tightens the third tightening screw 54.

Still referring to FIGS. 1-4, the depicted embodiment includes a machine adapter 56 that serves to connect the slide rail 50 to a machine tool 12 (e.g., a horizontal or vertical lathe) via a vice, or the like. The machine adapter 56 is designed to allow for precise varying positions of the universal tram 10, for example, from a cutting centerline of the machine tool 12. If the universal tram 10 is not set to the cutting centerline properly in an initial positioning of the slide rail 50, the universal tram 10 could be re-positioned using the machine adapter 56 and the optional adapter plate 58 (shown in FIGS. 1-3, for example). The machine adapter 56 allows for the universal tram 10 to be used on many different types and sizes of machining equipment 12.

The connection member 60 of the machine adapter 56 engages with the slide rail 50 and features a series of sets of apertures 62, 64, each of the sets of apertures 62, 64 are spaced apart vertically from one another by about ½ inch. It is to be understood that the apertures 62, 64 could be spaced apart from each other greater or less than ½ inch. In this embodiment, the set of apertures 62, 64 features apertures 62, 64 of two different sizes. Each of the three rows of apertures 62, 64 is arranged such that a larger, central aperture 62 is flanked on the left and the right by a smaller, support aperture 64. The vertically spaced aperture sets 62, 64 allow a user to select a height for the slide rail 50 relative to the machine adapter 56 that best serves the individual user's need. It will be appreciated that the machine adapter 56 may take on other forms besides that shown in FIGS. 1-4. For example, while the machine adapter 56 is shown as a unitary piece, in FIG. 6 for example, the machine adapter 56 may optionally include, in some alternative embodiments, an adapter plate 58 (shown in FIGS. 1-3, for example) positioned underneath the support base 66 to further adjust the positioning of the slide rail 50 and the remainder of the universal tram 10 relative to a machine tool 12. In embodiments including the adapter plate 58, the adapter plate 58 is designed to be about ¼ inch in thickness so that placing the adapter plate 58 under the support base 66 further adjusts the possible positions of the series of apertures 62, 64 such that the slide rail 50 can connect to the machine adapter 56 at any height measured from the bottom of the support base 66 (or adapter plate 58) between at least ¾ inch and 2 inches, such as during use with horizontal lathes or vertical lathes. It is to be understood that adapter plate 58 could have a thickness of greater or less than ¼ inch.

Still referring to FIGS. 1-4, to secure the slide rail 50 to the machine adapter 56 at a selected height, a user places pins 68, 70, into the machine adapter apertures 62, 64 and the slide rail apertures 72, 74. In this embodiment, the central pin 68 is larger in diameter than the supporting pins 70 to the right and the left of the central pin 68. In this embodiment, the central pin 68 has a larger diameter at least to facilitate the use of a set screw with the central pin 68. Once the slide rail 50 is engaged with the central and supporting pins 68, 70 inserted into the apertures 62, 64 of the machine adapter 56 and the apertures 72, 74 of the slide rail 50, a set screw may be threaded through the rear of the machine adapter 56 to secure the central pin 68 in place and thus secure the slide rail 50 to the machine adapter 56. Although the pins 68, 70 are shown as cylindrical projections in the illustrated embodiments, the pins can be replaced by any connector projection-like structures that can couple the machine adapter or machine tool to the slide rail in other embodiments without departing from the scope of the invention.

Figure 5:
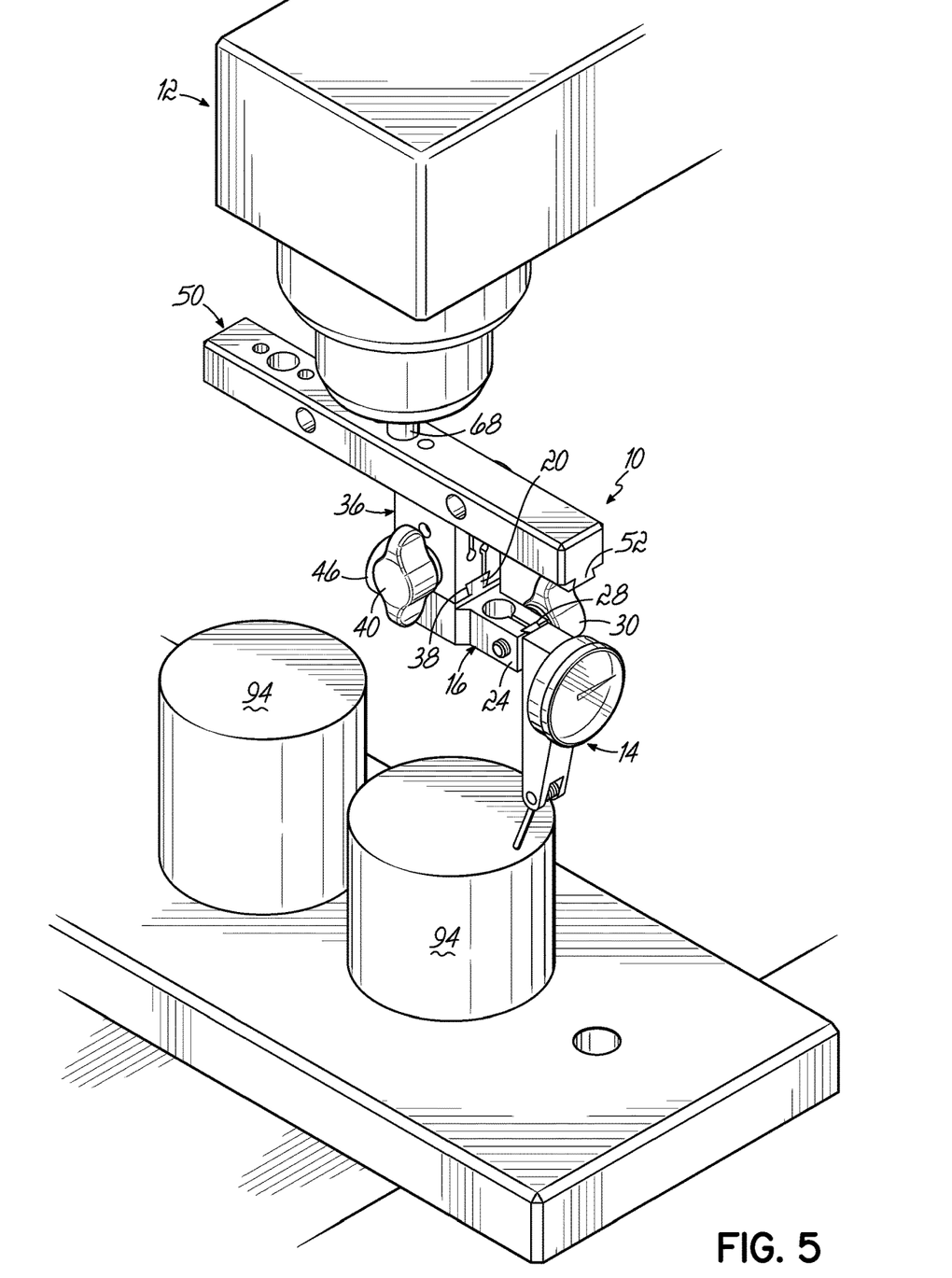
FIG. 5 is an environmental view of an alternative embodiment of a universal tram.

Although the universal tram 10 is shown being positioned by connection to the machine adapter 56 in FIGS. 1-4 and 6, it will be appreciated that the slide rail 50 can instead be directly coupled to machine tools 12 such as vertical or horizontal mills, drill presses, etc. in methods of use where such tools 12 and corresponding workpieces 94 are being trammed or aligned, as shown in FIG. 5 (and further described below). Once again, the universal tram 10 advantageously enables various measurement and tramming devices to be used on a variety of different types of shaping and machining equipment 12, while still permitting the precise location setting needed to adjust or tram such equipment 12.

Further, it will be appreciated that any number of attachments can be added to the universal tram 10 by virtue of the modular design of the universal tram 10. For example, a mirror attachment (not shown) could be attached to the universal tram 10. A mirror attachment could permit a user to view the readout of an indicator 14 secured to the indicator holder 16 if the universal tram 10 is positioned such that it would be otherwise difficult to read the indicator 14. For example, if the universal tram 10 is being used to check the inner diameter run-out on a horizontal mill it may be difficult to read an indicator 14 without the use of a mirror attachment or similar device. It will be understood that other attachments could be added to the universal tram 10 such as a flashlight or another light-generating device depending on the particular needs of a user.

Referring now to FIG. 5, an embodiment of the universal tram 10 without a machine adapter 56 or adapter plate 58 is shown being used in conjunction with a machine tool 12. In this embodiment, the universal tram 10 is connected directly to the machine tool 12 via a central pin 68—attached on one end to the machine tool 12 and attached on the other end to the slide rail 50 of the universal tram 10. As illustrated, the universal tram 10 can be used without the machine adapter 56 and adapter plate 58. For example, the universal tram 10 could connect directly to a vertical mill or CNC machine. It is to be understood that the universal tram 10 could also attach directly to other machine tools 12 without using a machine adapter 56 or adapter plate 58. Regardless of the particular machine tool 12, the universal tram 10 and measurement device (e.g., a dial test indicator 14) are held in a desired position to take measurements of workpieces 94 and/or shaping tooling so as to assure the proper alignment of all components (such methods for confirming alignment by rotating the tooling or workpieces 94 are well understood in the machining field).

Referring now to FIG. 6, an embodiment of the universal tram 10 including a machine adapter 56 is shown being used in conjunction with a machine tool 12. In this embodiment, the universal tram 10 is connected to the machine tool 12 via the machine adapter 56. As is illustrated, the universal tram 10 can be used with the machine adapter 56 to expand the plethora of machine tools 12 that the universal tram 10 is compatible with. For example, the universal tram 10 could connect with a machine adapter 56 (and optional adapter plate 58) to a turning machine or horizontal mill. It is to be understood that the machine adapter 56 could be used to attach the universal tram 10 to other machine tools 12. Regardless of the particular machine tool 12, the universal tram 10 and measurement device (e.g., a travel dial indicator 14) are held in a desired position to take measurements of workpieces 96 and/or shaping tooling so as to assure the proper alignment of all components (as noted above, such methods for confirming alignment by rotating the tooling or workpieces 96 are well understood in the machining field).

Further, FIG. 6 illustrates that additional indicators 14 (beyond those that directly attach to the first groove 28 of the indicator holder 16) can be used with the universal tram 10 through the addition of an indicator adapter 34. As shown, the indicator adapter 34 is a substantially L-shaped bracket featuring an indicator aperture 76 at an end, the indicator aperture 76 is configured to accept an indicator 14. For example, the indicator adapter 34 may be used with a travel dial indicator. After an indicator 14 is inserted through the indicator aperture 76 of the indicator adapter 34, a set screw 77 is inserted perpendicularly to the indicator aperture 76 to secure the indicator 14 in place. The indicator adapter 34 itself is then attached to the first groove 28 of the indicator holder 16 via a corresponding third rail 78 on the indicator adapter 34.

Referring generally to FIGS. 1-4 and 6, a method of use involving a universal tram 10 (with a machine adapter 56 and adapter plate 58) is described below in relation to measuring the outer diameter run-out of a turning machine. A similar method of use would apply to the universal tram 10 of FIG. 5, sans the portions related to the machine adapter 56 and adapter plate 58. The particular method of use is for illustrative purposes and is not intended to be limiting.

To measure the outer diameter run-out of a turning machine, the universal tram 10 is first releasably secured to the carriage of the machine 12 via a vice. The universal tram 10 is then adjusted such that the indicator 14 held by the indicator holder 16 is located at a center line position. In an embodiment, this adjustment can be accomplished by comparing the location of the tip of the indicator 14 to the location of the live center of the tailstock. To center the indicator 14, a user can adjust the height of the machine adapter 56 using an adapter plate 58 (shown in FIGS. 1-3, for example) and adjust the height of the slide rail 50 in relation to the machine adapter 56 by utilizing the various rows of apertures 62, 64 of the machine adapter 56. After affixing the slide rail 50 to the machine adapter 56, a user can adjust the lateral position of the indicator 14 by sliding the clamping coupler 36 along the slide rail 50. To adjust the position of the clamping coupler 36 on the slide rail 50, a user need only to loosen the appropriate third tightening screw 54, slide the clamping coupler 36 to a desired location, and then re-tighten the third tightening screw 54. After positioning the indicator 14 in roughly the desired position by adjusting the clamping coupler 36, a user can more finely adjust the lateral position of the indicator 14 by rotating the drive pin knob 46. Rotating the drive pin knob 46 will finely adjust the position of the indicator holder 16 either towards or away from the drive plate 42. After ensuring that the indicator 14 is centered in relation to the tailstock, a user can then rotate the vice securing the universal tram 10 to the turning machine and position the universal tram 10 such that the indicator 14 tip contacts the outside of the cylinder of the turning machine. Then, by rotating the cylinder, a user can determine the outer diameter run-out of the turning machine and adjust the turning machine accordingly.

While the present invention has been illustrated by the description of various embodiments and while these embodiments have been described in some detail, it is not the intention of the Applicant to restrict or in any way limit the scope of the invention to such detail. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A universal tram apparatus for positioning an indicator for aligning a machine tool, the universal tram comprising:
    an indicator holder for releasably securing the indicator, the indicator holder including a main body having a first rail along a length of a surface of the main body, the indicator holder further including arms extending laterally from a side of the main body adjacent to the surface, the arms forming a first groove at a distal end of the arms, the first groove configured to releasably secure the indicator in a position relative to the indicator holder when a first tightening screw is tightened;
    a clamping coupler including a second groove for receiving the first rail of the indicator holder, the second groove corresponding in cross-sectional shape to the first rail and configured to releasably secure the indicator holder relative to the clamping coupler when a second tightening screw is tightened, the clamping coupler further including a third groove on a side of the clamping coupler opposite that of the second groove; and
    a slide rail including an elongate second rail along a length of the slide rail, the second rail corresponding in cross-sectional shape to the third groove and configured to be received by the third groove, the second rail releasably secured relative to the clamping coupler when a third tightening screw of the clamping coupler is tightened,
    wherein the slide rail is removably attached to the machine tool by a central pin that is received at one end by the slide rail and at an opposite end by the machine tool.

2. The universal tram of claim 1, the clamping coupler further comprising:
    a drive plate removably fastened to the clamping coupler adjacent to the second groove, the drive plate including an aperture through which a drive pin is received, an end of the drive pin covered by a drive pin knob and an opposite end of the drive pin extending into the main body of the indicator holder,
    wherein the drive pin is threaded at the opposite end thereof, such that rotating the drive pin in a circumferential direction causes the indicator holder to move in a longitudinal direction along the second groove either towards or away from the drive plate.

3. The universal tram of claim 1, wherein the slide rail further includes a plurality of apertures on a side of the slide rail opposite the second rail, each of the plurality of apertures corresponding in size to the central pin and configured to receive the one end of the central pin such that a position of the slide rail relative to the machine tool can be adjusted by changing which aperture of the plurality of apertures on the slide rail receives the one end of the central pin.

4. The universal tram of claim 1, further comprising:
    a machine adapter for expanding a compatibility of the universal tram to include additional machine tools, the machine adapter comprising:
        an elongate support base configured to be releasably secured to a machine tool; and
        a connection member extending in a direction away from a surface of the support base, the connection member including a plurality of aperture sets spaced from each other at regular intervals, each of the aperture sets includes a larger central aperture flanked on either side by smaller support apertures, the central aperture corresponding in size to the central pin and configured to receive the opposite end of the central pin, each smaller support aperture corresponding in size to a supporting pin,
    wherein the slide rail further includes a plurality of aperture sets substantially similar to the aperture sets of the machine adapter, such that a position of the slide rail relative to the machine tool can be adjusted by linking one of the aperture sets of the slide rail to a corresponding aperture set of the machine adapter using a central pin and supporting pins.

5. The universal tram of claim 4, wherein the machine adapter further includes an adapter plate for changing a height of the machine adapter, the adapter plate placed beneath a bottom surface of the machine adapter such that a combined height of the machine adapter and adapter plate together is greater than the height of the machine adapter without the adapter plate by an amount corresponding to a thickness of the adapter plate.

6. The universal tram of claim 1, further comprising:
    an L-shaped indicator adapter including, at an end, a third rail corresponding in cross-sectional shape to the first groove and configured to be received by the first groove, the third rail releasably secured relative to the indicator holder when the first tightening screw of the indicator holder is tightened, the indicator adapter further including, at an opposite end, an aperture through which the indicator can be received, the indicator releasably secured relative to the indicator adapter by a set screw.

7. The universal tram of claim 1, wherein the indicator is one of a dial test indicator and a travel dial indicator.

8. A universal tram apparatus for positioning an indicator for aligning a machine tool, the universal tram comprising:
    an indicator holder configured to slidably receive the indicator and releasably secure the indicator in a position relative to the indicator holder;
    a clamping coupler configured to slidably receive the indicator holder and releasably secure the indicator holder in a position relative to the clamping coupler;
    a slide rail configured to be slidably received by the clamping coupler and releasably secured in a position relative to the clamping coupler; and a machine adapter for expanding a compatibility of the universal tram to include additional machine tools, wherein the slide rail is releasably secured to the machine adapter.

9. The universal tram of claim 8, the machine adapter comprising:
an elongate support base configured to be releasably secured to the machine tool; and
a connection member extending in from a surface of the support base and including a plurality of aperture sets spaced from each other at regular intervals.

10. The universal tram of claim 9, wherein the slide rail further includes a plurality of aperture sets substantially similar to the aperture sets of the machine adapter, such that a position of the slide rail relative to the machine tool can be adjusted by linking one of the aperture sets of the slide rail to a corresponding aperture set of the machine adapter.

11. The universal tram of claim 8, the machine adapter comprising:
an adapter plate for changing a height of the machine adapter relative to the machine tool.

12. The universal tram of claim 8, the clamping coupler further comprising:
a drive plate removably fastened to the clamping coupler, the drive plate including a drive pin that extends into the indicator holder,
wherein at least a portion of the drive pin is threaded such that rotating the drive pin in a circumferential direction causes the indicator holder to move in a longitudinal direction either towards or away from the drive plate.

13. The universal tram of claim 8, further comprising:
an L-shaped indicator adapter releasably secured to the indicator holder, the indicator adapter further including an aperture through which the indicator can be received and releasably secured.

14. The universal tram of claim 8, wherein the indicator is one of a dial test indicator and a travel dial indicator.

15. A method of using a universal tram to position an indicator for aligning a machine tool, the method comprising:
receiving the indicator in a first groove of an indicator holder, the indicator holder including a main body having a first rail along a length of a surface of the main body, the indicator holder further including arms extending laterally from a side of the main body adjacent to the surface, the arms forming the first groove at a distal end of the arms;
releasably securing the indicator in a position relative to the indicator holder by tightening a first tightening screw on the indicator holder;
receiving the first rail of the indicator holder in a second groove of a clamping coupler, the second groove corresponding in cross-sectional shape to the first rail, the clamping coupler further including a third groove on a side of the clamping coupler opposite that of the second groove;
releasably securing the indicator holder relative to the clamping coupler by tightening a second tightening screw on the clamping coupler;
receiving an elongate second rail of a slide rail in a third groove of the clamping coupler, the second rail corresponding in cross-sectional shape to the third groove;
releasably securing the second rail relative to the clamping coupler by tightening a third tightening screw on the clamping coupler; and
removably attaching the slide rail to the machine tool by a central pin that is received at one end by the slide rail and at an opposite end by the machine tool.

16. The method of claim 15, further comprising:
removably fastening a drive plate to the clamping coupler adjacent to the second groove, the drive plate including an aperture through which a drive pin is received, an end of the drive pin covered by a drive pin knob and an opposite end of the drive pin extending into the main body of the indicator holder, wherein the opposite end of the drive pin is threaded; and
rotating the drive pin in a circumferential direction and thereby causing the indicator holder to move in a longitudinal direction along the second groove either towards or away from the drive plate.

17. The method of claim 15, the step of removably attaching the slide rail to the machine tool further comprising:
removably securing a machine adapter to the machine tool, the machine adapter comprising:
an elongate support base configured to be releasably secured to the machine tool; and
a connection member extending in a direction away from a surface of the support base, the connection member including a plurality of aperture sets spaced from each other at regular intervals, each of the aperture sets includes a larger central aperture flanked on either side by smaller support apertures, the central aperture corresponding in size to the central pin and configured to receive the opposite end of the central pin, each smaller aperture corresponding in size to a supporting pin,
wherein the slide rail further includes a plurality of aperture sets substantially similar to the aperture sets of the machine adapter; and
adjusting a position of the slide rail relative to the machine tool by linking one of the aperture sets of the slide rail to a corresponding aperture set of the machine adapter using a central pin and supporting pins.

18. The method of claim 17, the step of removably securing a machine adapter to the machine tool further comprising:
placing an adapter plate beneath a bottom surface of the machine adapter to change a height of the machine adapter, such that a combined height of the machine adapter and adapter plate together is greater than the height of the machine adapter without the adapter plate by an amount corresponding to a thickness of the adapter plate.

19. The method of claim 15, the steps of receiving the indicator and releasably securing the indicator further comprising:
receiving a third rail at an end of an L-shaped indicator adapter in the first groove of the indicator holder, the third rail corresponding in cross-sectional shape to the first groove;
releasably securing the indicator adapter relative to the indicator holder by tightening the first tightening screw on the indicator holder;
receiving the indicator through an aperture in an opposite end of the indicator adapter; and
releasably securing the indicator relative to the indicator adapter by tightening a set screw in the indicator adapter.

20. The method of claim 15, wherein the indicator is one of a dial test indicator and a travel dial indicator.

\* \* \* \* \*